United States Patent
Labban (10) Patent No.: US 6,574,486 B1
(45) Date of Patent: Jun. 3, 2003

(54) METHOD AND APPARATUS FOR SELECTING AMONG CALLING OPTIONS IN A WIRELESS COMMUNICATION DEVICE

(75) Inventor: Mazen Labban, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/499,885

(22) Filed: Feb. 8, 2000

(51) Int. Cl.$^7$ .................................................. H04B 1/38
(52) U.S. Cl. ...................... 455/550; 455/566; 455/414; 455/552
(58) Field of Search ................................ 455/552, 553, 455/566, 414, 406, 558, 550, 575; 379/356, 355, 93

(56) References Cited

U.S. PATENT DOCUMENTS

| | | | |
|---|---|---|---|
| 5,117,449 A | * | 5/1992 | Metroka et al. ............... 379/58 |
| 5,509,056 A | | 4/1996 | Ericsson et al. |
| 5,581,595 A | * | 12/1996 | Iwashita et al. ............ 379/354 |
| 5,675,627 A | | 10/1997 | Yaker |
| 5,797,098 A | * | 8/1998 | Schroeder et al. .......... 455/464 |
| 5,845,205 A | | 12/1998 | Alanara et al. |
| 5,884,188 A | * | 3/1999 | Hayes, Jr. .................... 455/552 |
| 6,047,197 A | * | 4/2000 | Jarrad ......................... 455/566 |
| 6,097,964 A | * | 8/2000 | Nuovo et al. ................ 455/550 |
| 6,125,287 A | * | 9/2000 | Cushman et al. ........... 455/566 |
| 6,349,213 B1 | * | 2/2002 | Iyengar et al. .............. 455/462 |

FOREIGN PATENT DOCUMENTS

| | | |
|---|---|---|
| EP | 0781064 | 6/1997 |
| WO | 9604620 | 2/1996 |

* cited by examiner

*Primary Examiner*—Thanh Cong Le
*Assistant Examiner*—Lana Le
(74) *Attorney, Agent, or Firm*—Philip R. Wadsworth; Charles D. Brown; Kevin T. Cheatham (57) ABSTRACT

A method and apparatus for selecting among calling options in a wireless communications device is provided. A determination is made as to whether a calling option mode is to be selected, and if the calling option mode is selected, a plurality of calling options are displayed. The user selects a calling option from the plurality of displayed calling options, and a call is originated as a function of the selected calling option. The calling options include originating a call billable to a calling card account, originating a call using a paging service, and originating a call using a text messaging facility. A displayed set-up option corresponding to a calling option set-up facility is also provided.

9 Claims, 6 Drawing Sheets

METHOD AND APPARATUS FOR SELECTING AMONG CALLING OPTIONS IN A WIRELESS COMMUNICATION DEVICE

BACKGROUND OF THE INVENTION

1. Field of the Invention

The present invention relates generally to wireless telephony devices, and more particularly, to displaying and selecting among calling options in such a wireless telephony device.

2. Related Art

Nowadays, a telephone user, including a cellular telephone user, often has the flexibility of placing a telephone call using a number of different calling modes, including, for example, using a calling card, a paging service, or a text messaging facility.

A calling card telephone call is billable to a calling card account. Known types of calling cards include a prepaid calling card associated with an account having a prepaid telephone spending limit, and a subscription based calling card associated with an account that is billed monthly. To make an exemplary calling card call, an individual dials an eleven digit calling card access number associated with the calling card account, such as a 1-800-XXX-XXXX number, enters a four digit personal identification number, and then dials an eleven digit destination number to complete the call.

The user is therefore burdened with dialing or entering twenty-six digits at his or her telephone, in addition to any required control digits. Also, the user is burdened with remembering both the calling card access number and his or her personal identification number (PIN), both of which typically remain constant throughout many calls using the calling card account. Such burdens are a particular source of inconvenience to an "on-the-go" cellular telephone user.

To place an exemplary call to a pager destination using a paging service, a user first dials a paging service access number, and then, in response to a returned dial tone, a call-back or return number, as is known. Typically, therefore, the user is burdened with dialing up to as many as twenty-two digits to place the call. In the case of a cellular telephone user, the call-back number is usually a telephone number of the cellular telephone, referred to as a mobile identification number (MIN). Therefore, the cellular user must repetitiously enter the same MIN for each call to a pager destination.

One known technique for distinguishing between different calling modes at a call originating telephone requires the user to precede a destination number with a special code, such as a "1" digit for a calling card call or a "0" digit for a paging service call. This technique disadvantageously burdens the user with additional key strokes and with having to remember which codes correspond to which calling modes. Additionally, the user may not even be aware of all of the available calling modes supported by the telephone he or she is using.

Hence, there is a need to present a telephone user with viewable menu or list of available calling options, such as a calling card option and a paging option, from which the user can conveniently view all of the available calling options and select a desired calling option, without requiring the entry of an identifying code to identify and select the desired calling option.

There is a further need to minimize the number of digits a telephone user, especially a cellular telephone user, must remember and/or enter when placing a call using a calling card or a paging service, or any other calling mode.

SUMMARY OF THE INVENTION

The present invention provides a method and apparatus for selecting among calling options in a wireless communications device. The invention includes determining whether a calling option mode is to be selected, and then displaying a plurality of calling options if the calling option mode has been selected. The user selects a calling option from the plurality of displayed calling options, and a call is originated as a function of the selected calling option. The calling options include originating a call billable to a calling card account, originating a call using a paging service, and originating a call using a text messaging facility. A displayed set-up option corresponding to a calling option set-up facility is also provided.

Features and Advantages

The present invention facilitates the ease of use of a telephone, especially a cellular telephone, by displaying to the user a menu of calling options, including calling card, paging, and text messaging calling options, from which menu the user can conveniently view the calling options and then select one of the calling options without having to remember and/or enter a specific calling option identifying code.

The present invention has the advantageous feature of automatically originating a calling card call using a calling card access number and an associated PIN both automatically retrieved from a telephone memory, in response to the user selecting a calling card option from the menu of calling options.

The present invention has the further feature of automatically originating a call to a paging service using a paging service access number entered or selected by the user, in response to a paging service option being selected from the user menu of calling options. This feature advantageously includes an automatic retrieval and transmission of a paging call-back number, such as a MIN for a mobile telephone, from the calling telephone memory to the paging service in response to receipt of a dial tone from the pager service when the paging call is in progress.

The present invention has the feature of originating a text messaging call in response to the user selecting the text messaging option from the menu of calling options.

All of the above mentioned features advantageously minimize the number of digits a telephone user must remember and/or enter when placing a call using the calling card, paging service, or text messaging calling options.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
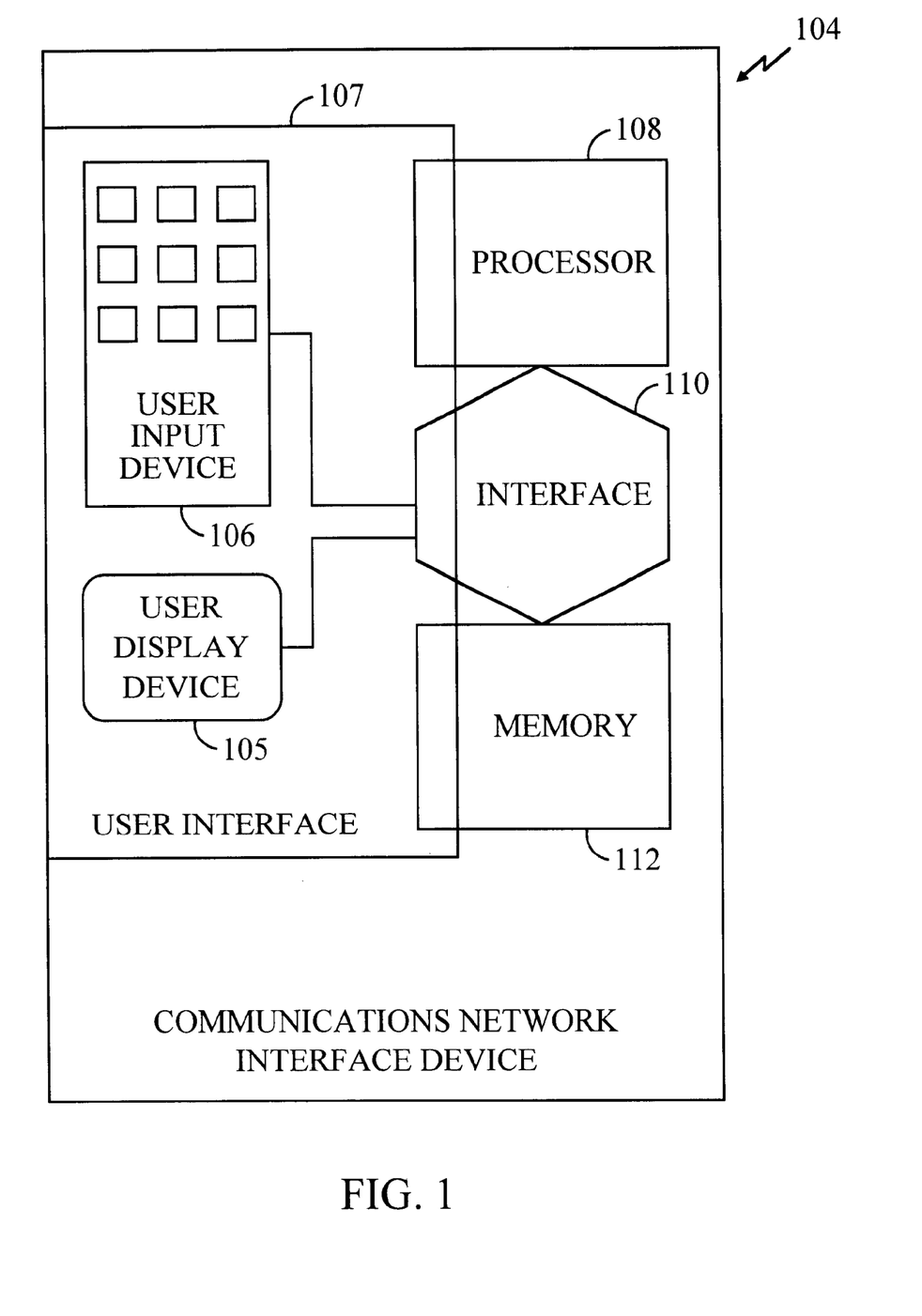
FIG. 1 is a block diagram of a communications network interface device according to a preferred embodiment of the present invention.

FIG. 1 is a block diagram of a communications network interface device 104. In a preferred embodiment, communications network interface device 104 is a wireless communications device, also referred to herein as a wireless telephone. Wireless telephones are stand alone units without physical connections that transmit signals to or receive signals from wireless communication networks. Examples of wireless telephones include portable, mobile, fixed cellular, and satellite telephones. Examples of communications network interface devices 104 also include any other device that interfaces with a communications network such as a wired telephone in a personal computer. Other devices that may be used to send and receive messages include pagers, personal digital assistants (PDAs), wireless personal computers, and other devices that can transmit and/or receive information via a wireless communications network.

For convenience, the following description will be presented in terms of a wireless telephone. However, as noted, and as will be apparent to persons skilled in the relevant arts, the invention is applicable to other communications network interface devices. In alternate embodiments of the present invention that do not involve wireless technology, communications network interface device 104 is any communications device which can interface via a direct connection with a communications network that can send and/or receive messages. Examples of such devices include wired telephones, personal computers, and facsimile machines. For either wired or wireless devices, a telephone card or computer program product may be used which would include memory comprising the present invention.

Wireless telephone 104 includes a user display device 105, a user input device 106, a processor 108, an interface 110, and memory 112. Examples of user display device 105 include a cathode ray tube, a liquid crystal display, and a light emitting diode or other flat panel display device. Examples of user input device 106 include a telephone keypad or touch screen device. User display device 105 and user input device 106 are within a user interface 107. User interface 107 also comprises some processing and memory capability of processor 108 and memory 112 in order to process and store data entered by the user using input device 106 and to display data, such as alphanumeric symbols and icons, via user display device 105.

Wireless telephone 104 is used to transmit signals to and receive signals from a communications network (not shown) in order to originate and complete a call to a recipient, referred to as a destination. Wireless telephone 104 is also used to send and receive text messages. Text messages can be sent and received by text message transfer applications, such as short messaging service (SMS).

SMS applications offer messaging services. These services are typically used for voice mail notification, caller ID, and short messages transferred between one or more communications network interface devices 104. SMS applications essentially provide enhanced paging functionality to communications network interface devices 104. SMS applications also provide the ability to acknowledge incoming messages to communications network interface devices 104. SMS is a viable service for short, bursty, non time-critical data. An SMS application can either buffer entered message text in communications network interface device 104 before it is sent or send message text as soon as it is entered.

An exemplary communication network is a mobile telephone system using code division multiple access (CDMA) such as the network described in U.S. Pat. No. 5,103,459 entitled "System and Method for Generating Signal Waveforms in the CDMA Cellular Telephone System" issued Apr. 17, 1992 to the assignee of the present invention and incorporated herein by reference.

The elements of wireless telephone 104 are connected in the following manner. User display device 105 and user input device 106 are connected to interface 110 for connectivity with processor 108 and memory 112; Interface 110 is connected to memory 112 and processor 108. User interface 107 also includes one or more software components that reside in memory 112 and are processed by processor 108.

In a preferred embodiment, wireless telephone 104 is not physically connected to equipment in a communications network. Rather, wireless telephone 104 transmits signals to and receives signals from a base station within a communications network via an antenna or satellite that is within range and has capacity to communicate with wireless telephone104. In alternate embodiments that do not involve cellular technology or satellites, communications network interface device 104 is physically connected to an exchange within a communications network.

User input device 106 may be a keypad on a telephone, a keyboard on a personal computer or any other device that can accept user input. In a preferred embodiment where user display device 105 is a flat panel display and user input device 106 is a telephone keypad, a user enters alphanumeric characters through user input device 106 while user display device 105 displays the entered characters. The user interacts with user interface 107 to select alphanumeric characters displayed on user display device 105 using a scrolling technique. Scrolling is performed using arrow keys on the wireless telephone keypad.

The preferred embodiment of wireless telephone 104 includes a keypad having a SEND key uniquely modified in accordance with the present invention to function as either a normal SEND key or a "LONG SEND" key. When the user depresses the SEND key for a duration less than a predetermined time, wireless telephone 104 originates a normal call, that is, a normal SEND to a previously entered destination, as is known. However, when the user depresses the SEND key for a duration greater than the predetermined time, representing the LONG SEND, wireless telephone 104 enters a calling option mode, as will be described below.

Processor 108 may comprise one or more processors that have the capability of processing computer software in the form of lines of executable code comprising commands from a computer programming language residing in device memory 112. Processor 108 may comprise processing capability distributed among one or more application specific integrated circuits (ASICs) or other hardware capable of processing computer software. The Mobile Station Modem™ (MSM™) chip is an ASIC suited for wireless telephone 104. The MSM™ chip is designed for use in wireless communications and incorporates processor 108 and CDMA functionality. Exemplary processors 108 include the Advanced RISC Machines (ARM®) microprocessor and the Intel 186 processor which are currently used in mobile cellular telephones. Another example of processor 108 is a personal computer processor.

Interface 110 is any connectivity that allows a functional connection of components within wireless telephone 104. Interface 110 also allows the transmission of electrical signals between components of wireless telephone 104.

Memory 112, also referred to as storage medium, is any storage medium. Examples of memory 112 include short term memory, long term memory, non-volatile memory, removable memory such as a floppy disk, or any other memory that can be used to store computer code or information processed by computer software. Memory 112 may be distributed among one or more hardware storage medium components. In a preferred embodiment, memory 112 can retain stored data even when wireless telephone 104 is powered down.

In addition, wireless telephone 104 includes user interface 107. User interface 107 contains components and software for accepting and displaying user input. Also, user interface 107 includes software residing in memory 112 and processed by processor 108 that interprets user input and stores information regarding particular messages and/or displays the messages. Software for accepting user input and displaying information will be described in further detail with respect to FIG. 2.

Figure 2:
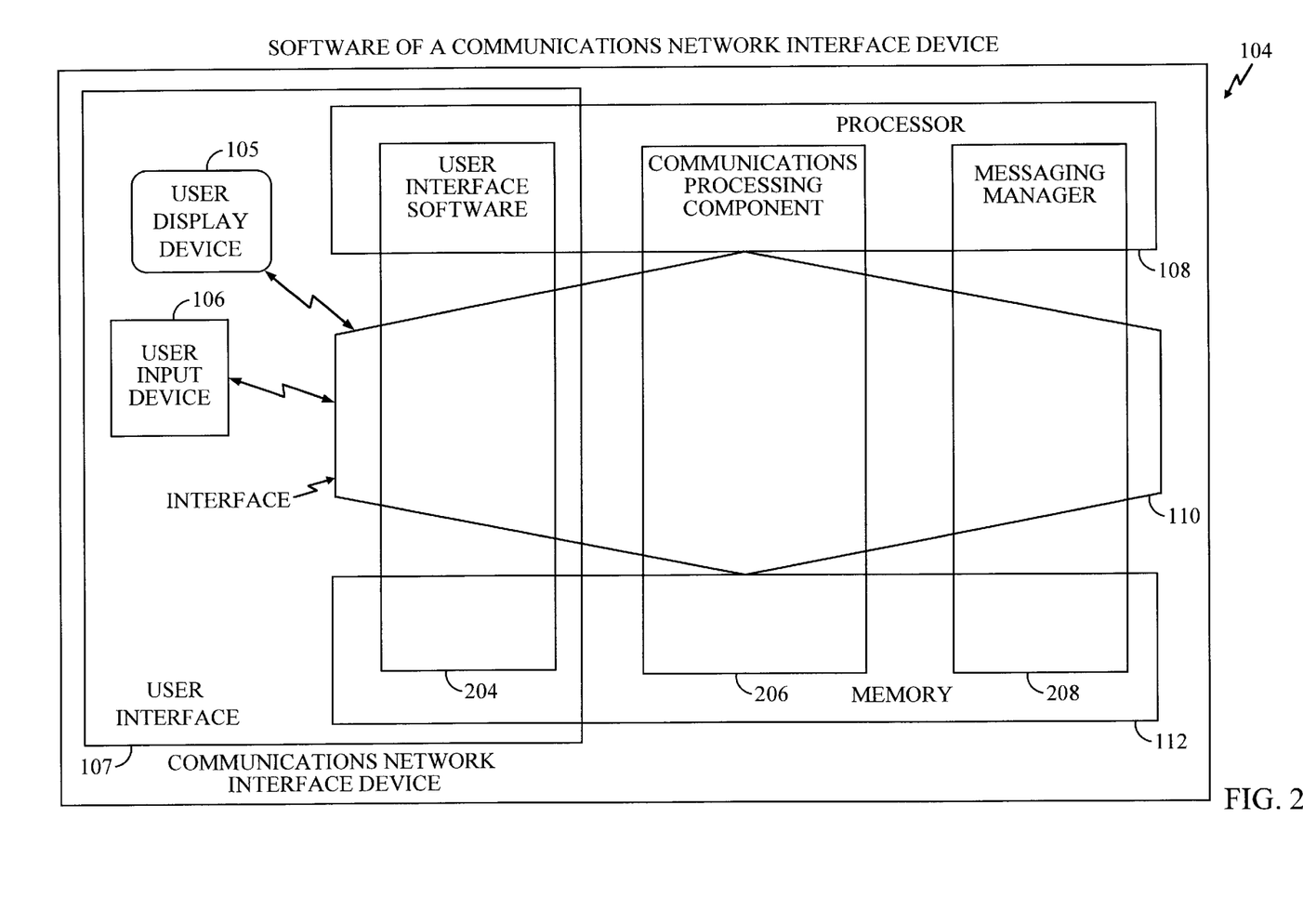
FIG. 2 is a block diagram of software components of the communications network interface device of FIG. 1.

FIG. 2 is a block diagram illustrating software of wireless telephone 104. Memory 112, within wireless telephone 104, stores lines of code which are processed by processor 108. Lines of code are commands from a computer programming language that are processed by processor 108 to perform specific functions. Software components comprising lines of code from a computer programming language that reside in memory 112 of wireless telephone 104 and are processed by processor 108 include a user interface software 204, a communications processing component 206, and a messaging manager 208.

Each software component includes one or more software modules. A software module is a portion of computer program code that performs a set of specified functions. Examples of software modules include subroutines, functions, objects, programs, and subprograms. If user interface software 204 is implemented with multiple software modules, each software module may exist within one subroutine and/or computer program. Each software module may also be distributed through multiple subroutines and/or programs.

User interface software 204 comprises one or more software modules. These modules store information. Examples of information that may be stored and retrieved by user interface software 204 are the destination, source, time, and length of messages, destination telephone numbers, calling card access numbers and associated PINs, call-back numbers and one or more MINs. A MIN uniquely identifies a wireless telephone and is the telephone number others dial to reach the wireless telephone. User interface software 204 may also store and retrieve any other information that may be obtained by use of wireless telephone 104 with respect to originating and receiving a call. User interface software 204 receives information from user input device 106, such as telephone number destinations. User interface software 204 also stores information in memory 112.

In a preferred embodiment, communications processing component 206 performs automatic processing of messages. This component terminates messages via a communications network to one or more recipients. Communications processing component 206 receives destinations selected by a user through user input device 106 or from other software and hardware components of wireless telephone 104. Communications processing component 206 also performs processing that is necessary to route calls and messages through communications networks to selected destinations. That is, communications processing component 206 performs call origination. For example, in a cellular communications network, communications processing component 206 would transmit information needed to send a message to an antenna, then via a digital link to a mobile telephone switch in order to connect to selected destinations. Destinations entered by a user using input device 106 correspond to other communications network interface devices 104. In an alternate embodiment, destinations also include storage in memory 112 and storage in a text message buffer that exists in wireless telephone 104. Communications processing component 206 performs processing that needs to be completed by wireless telephone104 to transmit messages via communications networks. Similar to user interface software 204, communications processing component 206 may be one or more software modules.

Figure 3:
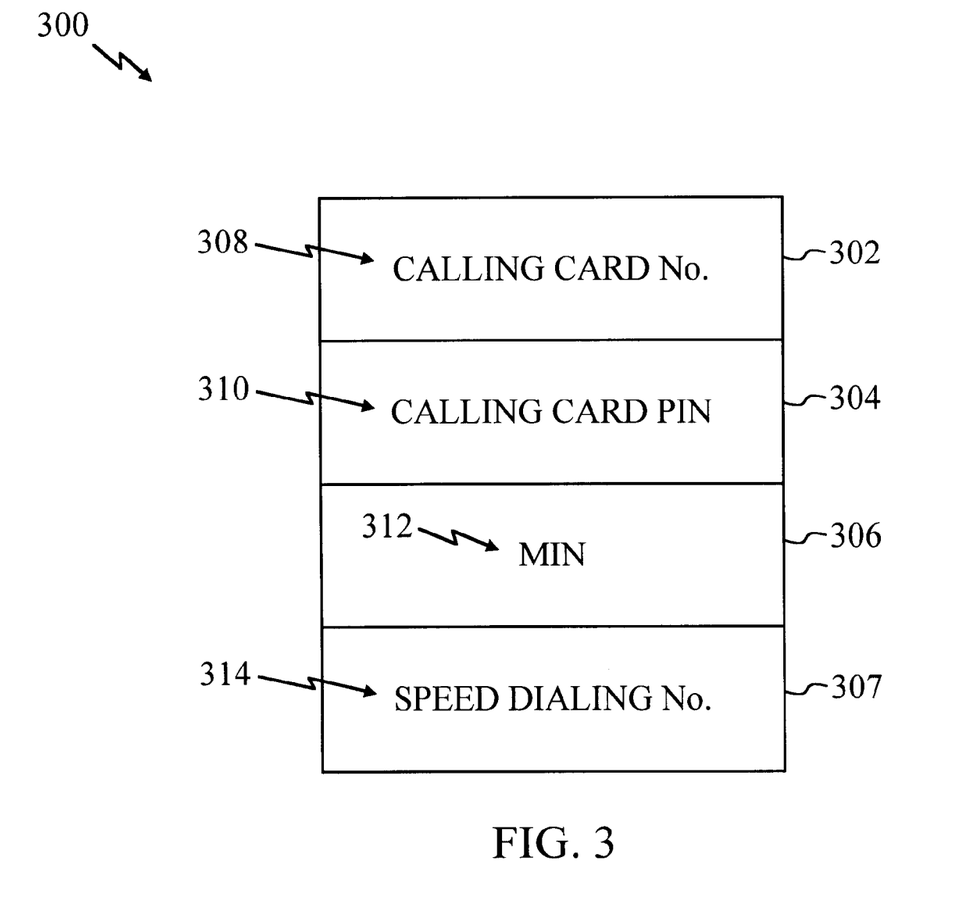
FIG. 3 is an illustration of an exemplary memory buffer in the device of FIG. 1, according to an embodiment of the present invention.

Memory 112 includes a memory buffer 300, depicted in FIG. 3. Memory buffer 300 includes exemplary memory locations 302, 304, 306, and 307 for respectively storing a calling card telephone access number 308 associated with a calling card account, a calling card PIN 310 required for accessing the calling card account, a MIN 312, and a speed dialing telephone number 314. In practice, memory buffer 300 is expanded to include a plurality of each of the aforementioned items 308–314. The user enters items 308–314 into wireless telephone 104 for storage in memory buffer 300 using user input device 106. Items 308–314 are stored to and retrieved from memory buffer 300 as required in accordance with the process of the present invention described below.

Figure 4:
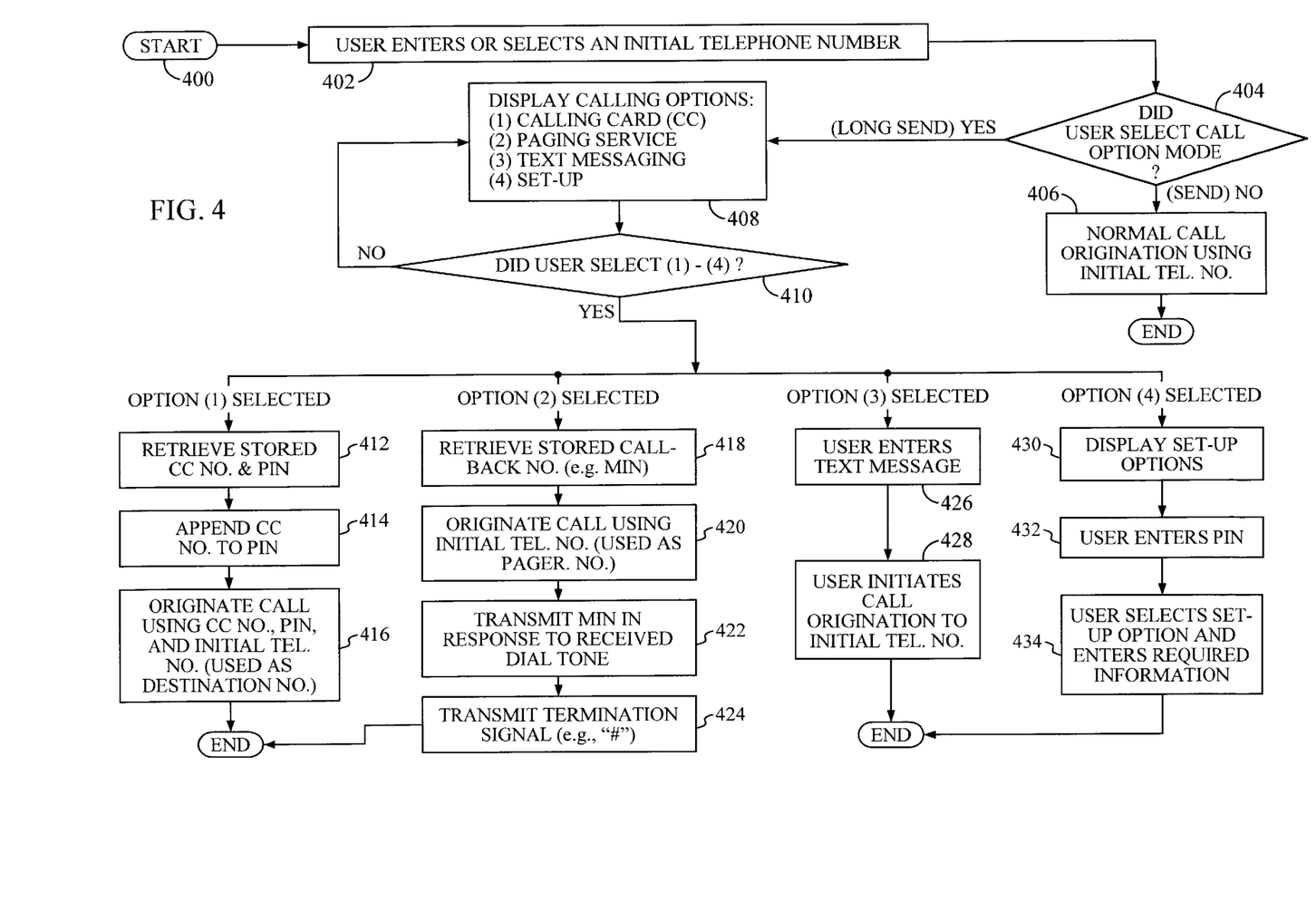
FIG. 4 is a flowchart illustration of the operation of the device of FIGS. 1 and 2, according to an embodiment of the present invention.

FIG. 4 is a flow chart illustrating the operation of wireless telephone104 according to a preferred embodiment of the present invention. The operation includes a sequence of steps beginning at a step 402. At step 402, a user either enters or selects an initial telephone number, which can be a destination for a calling card call, a text messaging call, and a normal call, or a telephone access number for a paging service. The user can enter each digit of the initial telephone number using the alphanumeric keypad, or select the initial telephone number using a memory based speed-dialing feature of the wireless telephone. Speed dialing requires the user to enter only a one or two digit code, such as "00", identifying a telephone number stored in memory buffer 300 (such as speed dialing number 314 in FIG. 3).

At a step 404, user interface 204 determines whether the user has selected a calling option mode or if the user has selected a normal call originating procedure by monitoring the SEND key of wireless telephone 104. If the user has selected a normal call originating procedure, for example, by momentarily depressing the SEND key, then at a step 406, wireless telephone 104 automatically originates a normal call to the destination entered previously at step 402.

On the other hand, if the user has selected the calling option mode using the LONG SEND, at a step 408, user interface software 204 displays a menu or enumerated list of available calling options to the user via user display 105. An exemplary listing of available calling options includes (1) a calling card option corresponding to originating a call billable to a calling card account, (2) a paging service option corresponding to originating a call to a paging service, (3) a text messaging option corresponding to originating a call and using a text messaging facility of the wireless telephone, and (4) a set-up option corresponding to a calling option set-up facility. By merely glancing at display 105, the user is conveniently informed of the available calling options.

At a step 410, user interface 204 determines whether the user has selected any one of displayed calling options (1)–(3), or set-up option (4), using user input device 106. For example, to select a calling option, the user can enter a digit "(1)"–"(4)" corresponding to a desired option, or use the scrolling technique to highlight and select the desired option.

If at step 410 the user selects calling card option (1), wireless telephone 104 originates a calling card call, as is now described with reference to sequence steps 412–416. At step 412, processor 108 automatically retrieves calling card telephone access number 308 and associated calling card PIN 310 from respective memory locations 302 and 304 of memory buffer 300. At a step 414, processor 108 appends retrieved calling card number 308 and PIN 310 to the call destination entered previously at initial step 402. Next, at step 416, the wireless telephone automatically originates a calling card call to the call destination using retrieved calling card telephone access number 308, PIN 310 and the call destination. This call is billed to a calling card account associated with the calling card telephone access number.

If at step 410 the user selects paging service option (2), wireless telephone 104 originates a call to a paging service, as is now described with reference to sequence steps 418–424. At step 418, processor 108 automatically retrieves a paging call-back number from memory buffer 300. In the case of a wireless telephone user, the call-back number is most typically MIN 312 of wireless telephone 104. However, other call-back numbers can be programmed into memory buffer 300 as an alternative to MIN 312. At a step 420, wireless telephone 104 automatically originates a call to the paging service using the initial telephone number entered previously at step 402 as the paging service access number. At a step 422, wireless telephone 104 automatically transmits the retrieved call-back number (for example, MIN 312) to the telephone network (that is, to the paging service) in response to receiving a dial tone from the paging service indicating a telephone connection therewith. At step 424, telephone 104 transmits a termination signal, such as a DTMF tone corresponding to a pound (#) character, to the paging service to indicate an end of transmission. It should be appreciated that in the above described sequence, the order of steps 418 (retrieving the call-back number) and 420 (originating the call) can be reversed, whereby the call-back number is retrieved from memory buffer 300 after the paging service telephone number has been dialed.

If at step 410 the user selects text messaging option (3), wireless telephone 104 originates a call and uses a text messaging facility, as is now described with reference to sequence steps 426 and 428. At step 426, the user enters a text message using the telephone keypad, and/or retrieves a previously stored text message from memory 112. User interface software 204 displays the text message on display 105. At step 428, the user initiates a call origination to the initial telephone number entered at previous step 402. The text message is transmitted to the destination once a telephone link is established. It should also be appreciated that text messages transmitted from a destination terminal can be received by telephone 104 and displayed to display 105 while a telephone link exists between wireless telephone 104 and the destination terminal.

If at step 410 the user selects set-up option (4), the user can enter the calling option set-up facility of wireless telephone 104, as is now described with reference to sequence steps 430–434. At step 430, user interface software 204 displays a menu or list of calling option set-up alternatives. At a step 432, the user enters a wireless telephone security PIN permitting user entry into any of the displayed set-up alternatives. At step 434, the user can select one of the displayed set-up alternatives to establish calling option information. For example, at step 434, the user can program into memory 300 a calling card number and associated PIN, or a paging service access number for later retrieval during execution of the calling card or paging service options (1) or (2), respectively. It should be appreciated that the set-up option sequence steps 430–434 and the results achieved thereby, can alternatively be implemented in a telephone initialization process executed separately from and independently of the calling option mode process depicted in FIG. 4.

Figure 5:
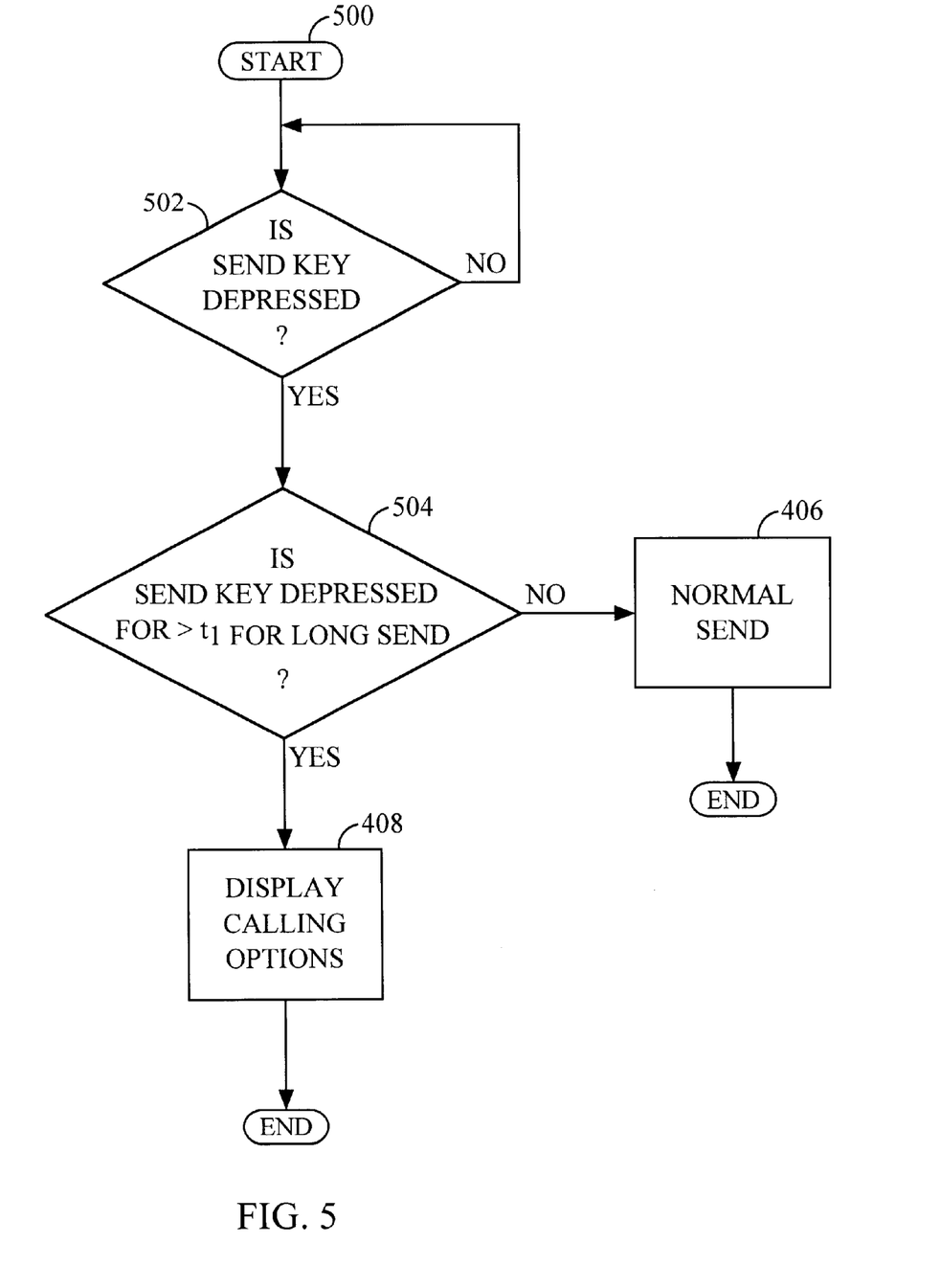
FIG. 5 is a flowchart illustrating the operation of a SEND key of the device of FIGS. 1 and 2, according to an embodiment of the present invention.

The process of selecting the calling option mode step 404 of FIG. 4 is depicted in further detail in FIG. 5. The present invention modifies the normal SEND key functionality to enable the user to use the SEND key for either originating a normal telephone call, as is known, or uniquely selecting the calling option mode of the present invention to display available calling options (1)–(3), and set-up option (4). The SEND key functionality of the present invention is depicted by the process of FIG. 5. At a beginning step 502, processor 108 determines whether the SEND key is depressed by the user. If the SEND key is depressed, at a step 504, a time sensing function of wireless telephone 104 implemented in software, hardware, or a combination of both, determines whether the SEND key is continuously depressed for at least a predetermined time $t_1$. Depressing the SEND key for a time less than $t_1$ causes the SEND key to operate as a normal SEND; that is, to originate a normal telephone call as indicated at step 406. On the other hand, continuously depressing the SEND key for at least a predetermined time $t_1$ indicates the LONG SEND. In an exemplary implementation, $t_1$> two or three seconds. Processor 108 detects the LONG SEND and responds by displaying calling options (1)–(4), as indicated at step 408.

An advantage of the SEND/LONG SEND selection functionality described above is that the user is not burdened with remembering and entering a special digit to access the calling options mode. It should be appreciated that a key other than the SEND key can be assigned the LONG SEND function for selecting the calling options mode.

Figure 6:
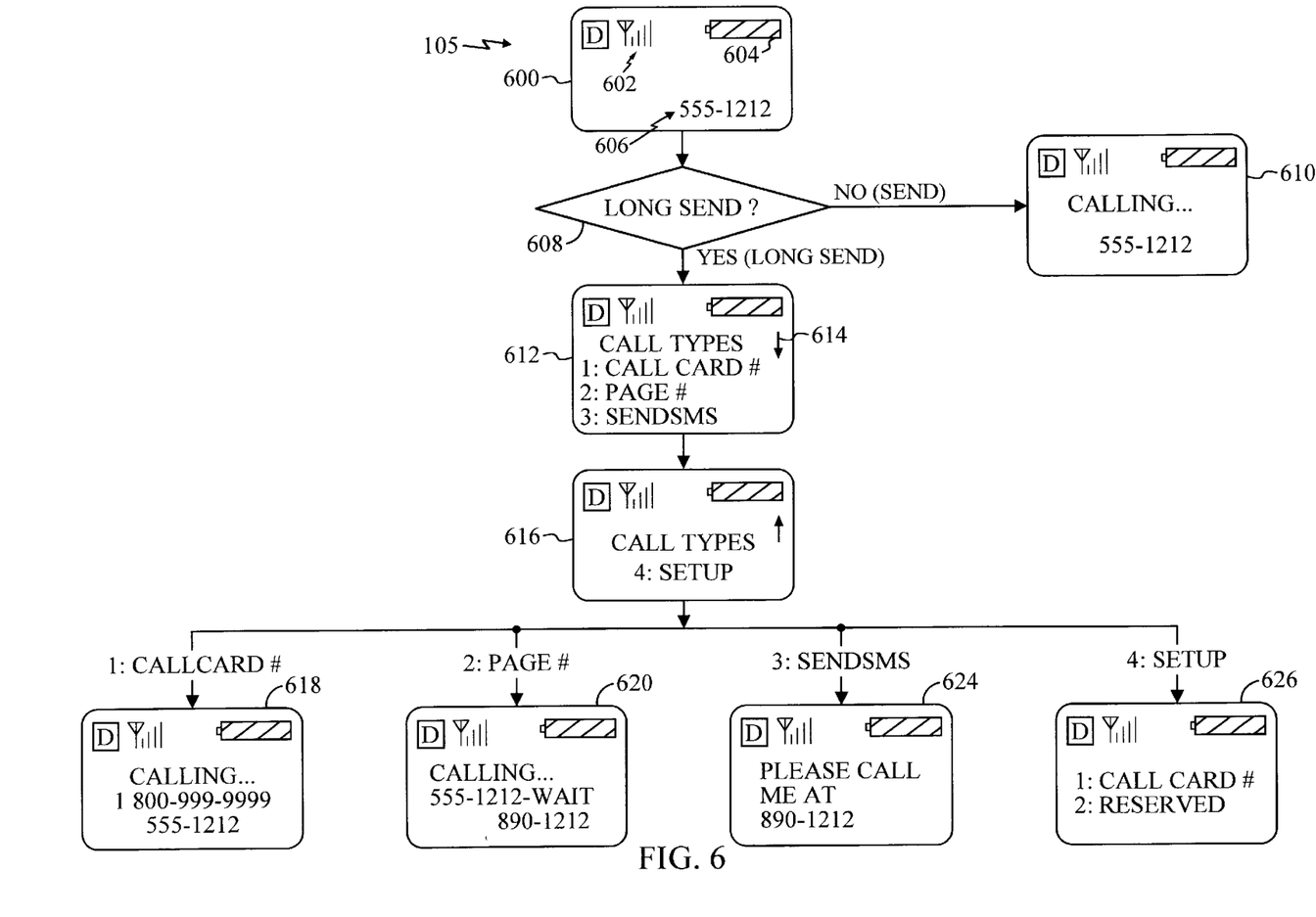
FIG. 6 is a series of device display presentations corresponding to the flowchart of FIG. 4.

An exemplary sequence of user display views corresponding to the sequence steps of FIG. 4, is depicted in FIG. 6. Beginning at the top of FIG. 6, a display view 600 of display 105, corresponding to step 402 of FIG. 4 after the user has entered the initial telephone number, includes a received signal strength indicator 602, a battery level indicator 604, and an exemplary destination 606, as is fairly typical for wireless telephones.

A decision block 608 (which is not a display view), corresponding to step 404 of FIG. 4 and steps 502 and 504 of FIG. 5, represents whether the user has selected SEND or LONG SEND. If the user selected SEND, a display view 610 is presented to the user indicating a normal call origination to destination 606.

On the other hand, if LONG SEND is selected, then a display view 612 is presented to the user. Display view 612 presents the calling card, paging service and text messaging (SMS) options (1)–(3) to the user. The label "SEND SMS" represents "SEND short message service", which is a text messaging facility. A Down-Arrow icon 614 indicates further options can be displayed by down-scrolling. For example, if the user scrolls-down, a further display view 616 presents the set-up option (4).

If the user selects calling card option (1) (FIG. 4, steps 412–416), a display view 618 is presented to the user. The displayed message:

CALLING ... 1-800-999-9999
555-1212 indicates a call is being made to the destination "555-1212" using the calling card number "1-800-999-9999".

Similarly, if the user selects paging service mode (2) (FIG. 4, steps 418–424), a display view 620 is presented to the user. The displayed message:

CALLING ... 555-1212-WAIT
890-1212 indicates a call is being made to a paging service having an access number "555-1212-WAIT", with a call-back number "890-1212", which is typically MIN 312 of wireless telephone 104.

If the user selects text messaging option (3) a display view 624 is presented to the user displaying an exemplary text message: "Please call me at 890-1212". The text message may be a message transmitted from the wireless telephone 104 to the destination, or a message transmitted in the reverse direction and received by wireless telephone 104.

If the user selects set up mode (4), a display view 626 lists set-up options, such as, storing a calling card number into memory buffer 300. Other options can be listed as needed and supported by wireless telephone 104.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of selecting among calling options in a wireless communications device, comprising:

determining whether a calling option mode is to be selected;

displaying calling options if a calling option mode has been selected, wherein the displaying calling options step includes displaying a calling option corresponding to originating a call using a paging service;

selecting one calling option from a plurality of displayed calling options;

originating a call as a function of the selected calling option;

selecting the calling option corresponding to originating a call using a paging service;

automatically retrieving a stored, call-back telephone number;

automatically originating a call to the paging service using a paging service access telephone number entered or selected before the determining step;

automatically transmitting the retrieved, call-back telephone number in response to receiving a dial tone; and automatically transmitting a signal indicative of an end-of-transmission after the call-back telephone number is transmitted.

2. A method of selecting among calling options in a wireless communications device, comprising:

determining whether a calling option mode is to be selected;

displaying calling options if a calling option mode has been selected, wherein the displaying calling options step includes displaying a calling option corresponding to originating a call using a paging service;

selecting one calling option from a plurality of displayed calling options;

originating a call as a function of the selected calling option;

selecting the calling option corresponding to originating a call using a paging service;

automatically retrieving a stored, call-back telephone number;

automatically originating a call to the paging service using a paging service access telephone number entered or selected before the determining step;

automatically transmitting the retrieved, call-back telephone number in response to receiving a dial tone;

automatically transmitting a signal indicative of an end-of-transmission after the call-back telephone number is transmitted; and wherein the call-back telephone number is a mobile identification number of the device.

3. A method of selecting among calling options in a wireless communications device, comprising:

determining whether a calling option mode is to be selected;

displaying calling options if a calling option mode has been selected, wherein the displaying calling options step includes:

displaying a first calling option corresponding to originating a call billable to a calling card account;

displaying a second calling option corresponding to originating a call using a paging service;

displaying a third calling option corresponding to originating a call and using a text messaging facility;

displaying a set-up option corresponding to a calling option set-up facility;

selecting one calling option from a plurality of displayed calling options;

originating a call as a function of the selected calling option;

selecting the set-up option;

entering a personal identification number to access the calling option set-up facility; and storing at least one telephone number associated with one of the first and second calling options.

4. A method of selecting among calling options in a wireless communications device, comprising:

determining whether a calling option mode is to be selected;

displaying calling options if a calling option mode has been selected;

selecting one calling option from a plurality of displayed calling options;

originating a call as a function of the selected calling option; and wherein the determining step comprises sensing whether a predetermined device key is depressed for at least a predetermined time interval; and the displaying calling options step is activated only after the predetermined device key has been continuously depressed for at least said predetermined time interval.

5. An apparatus for selecting among calling options in a wireless communications device, comprising:

means for determining whether a calling option mode is to be selected;

means for displaying a calling option corresponding to originating a call using a paging service if a calling option mode has been selected;

means for selecting the displayed calling option;

means for automatically retrieving a stored, call-back telephone number;

means for automatically originating a call to the paging service using a paging service access telephone number entered or selected using means for entering or selecting the paging service access telephone number;

means for receiving a dial tone and for automatically transmitting the retrieved call-back telephone number in response to receiving the dial tone; and means for automatically transmitting a signal indicative of an end-of-transmission.

6. The apparatus of claim 5, wherein the call-back telephone number is a mobile identification number of the device.

7. An apparatus for selecting among calling options in a wireless communications device, comprising:

means for determining whether a calling option mode is to be selected;

means for displaying calling options if a calling option mode has been selected, wherein said displaying means includes means for displaying a set-up option corresponding to a calling option set-up facility;

means for selecting one calling option from a plurality of displayed calling options;

means for originating a call as a function of the selected calling option;

means for selecting the set-up option;

means for entering a personal identification number to access the calling option set-up facility; and means for storing at least one telephone number associated with one of the first and second calling options in a memory of the device.

8. An apparatus for selecting among calling options in a wireless communications device, comprising:

means for determining whether a calling option mode is to be selected;

means for displaying calling options if a calling option mode has been selected;

means for selecting one calling option from a plurality of displayed calling options;

means for originating a call as a function of the selected calling option; and wherein said determining means comprises time sensing means for sensing when a predetermined device key is depressed for at least a predetermined time interval to select the calling options mode.

9. A computer program product comprising computer usable media having computer readable program code means embodied in said media for causing application programs to execute on a computer processor in a wireless communication device to enable a user to select among calling options, said computer readable program code means comprising:

a first computer readable program code means for causing the processor to determine whether a calling option mode is to be selected;

a second computer readable program code means for causing the processor to display calling options if a calling option mode has been selected;

a third computer readable program code means for causing the processor to select one calling option from a plurality of displayed calling options;

a fourth computer readable program code means for causing the processor to originate a call as a function of the selected calling option; and wherein the first program code means includes computer readable program code means for causing the processor to sense when a predetermined device key is depressed for at least a predetermined time interval to select the calling options mode.

* * * * *